July 24, 1956 — N. C. BREMER — 2,755,677
DETACHABLE CHAIN WITH PINTLE PIN FASTENING MEANS
Filed Nov. 12, 1952
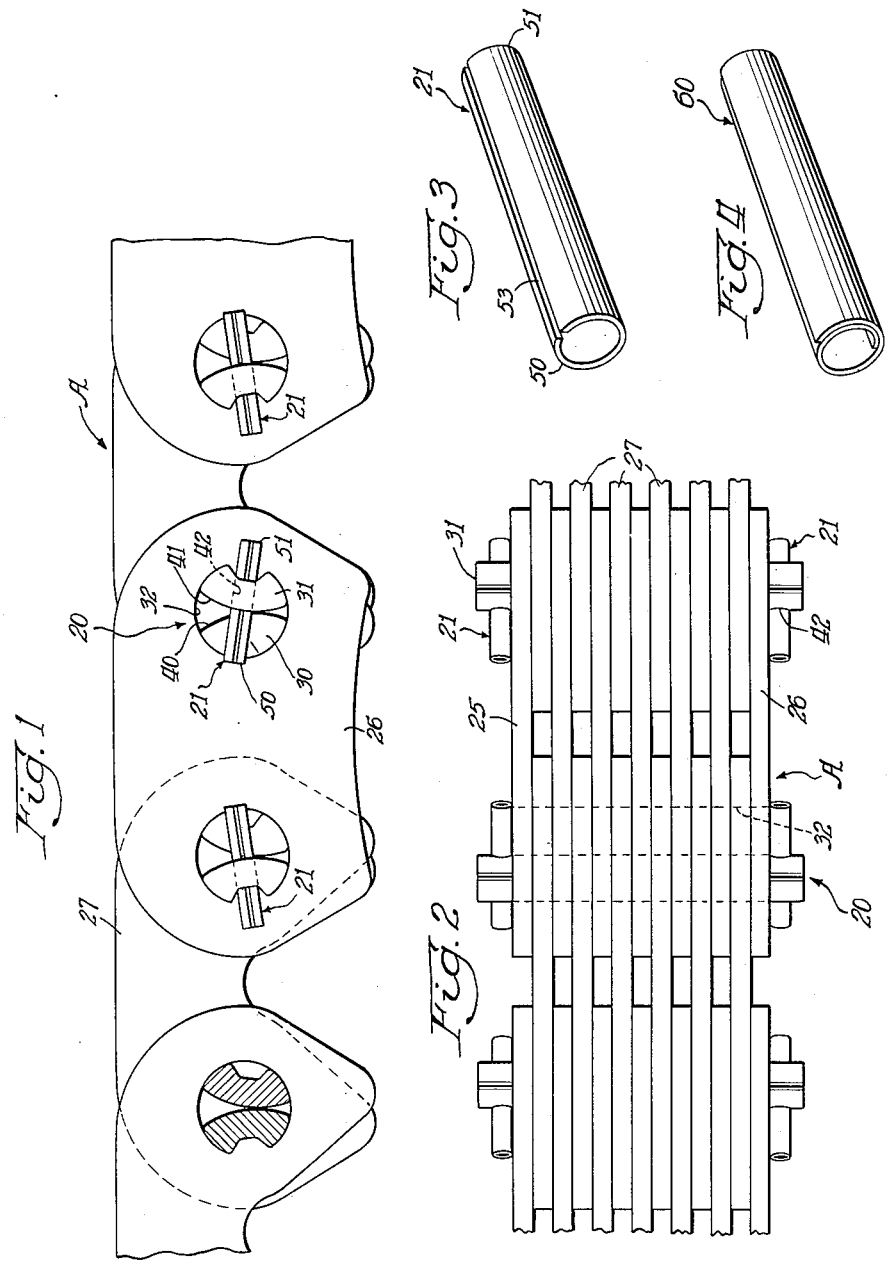
Inventor:
Norman C. Bremer
By: Joseph M. Gartner
Atty.

United States Patent Office 2,755,677
Patented July 24, 1956

2,755,677

DETACHABLE CHAIN WITH PINTLE PIN FASTENING MEANS

Norman C. Bremer, Ithaca, N. Y., assignor to Morse Chain Company, Ithaca, N. Y., a corporation of New York Application November 12, 1952, Serial No. 320,040

2 Claims. (Cl. 74—254)

This invention relates, in general, to a chain having a novel pintle means including fastening means therefor whereby the chain may be advantageously and conveniently assembled and/or disassembled.

Otherwise stated, the invention is embodied, generally, in a chain construction, and particularly to a means of adapting silent power transmission chain sometimes referred to as inverted tooth silent chain so as to make the chain easily and quickly detachable.

Many of the previous designs of silent chains have incorporated riveted pins or pins containing washers and the pin is riveted or peened so that disassembly involved the destruction of the pin and washer. This is a handicap in that quite frequently disassembly of the chain is only required to facilitate moving the equipment from one location to another such as is often done with oil well drilling equipment.

In this connection when disassembling the chain, if the pin is destroyed or damaged so that it cannot be used again, a new pin is not always easily available. Moreover, if the chain has had some degree of wear it is desirable that the pin used to reconnect the chain has the same amount of wear so as not to introduce a shorter pitch in assembly.

More specifically stated, it is a general object and accomplishment of the invention to provide improvements in power transmission chains which makes possible stocking chains in coils from which required lengths may be advantageously and conveniently taken and assembled without loss or damage of parts.

A further object and accomplishment of the invention is to provide improvements in power transmission chains permitting quantities of identical parts of the chain to be packed for convenient shipment and so that the chain may be advantageously assembled in desirable lengths on the site where the chain will be employed. In this connection, retail outlets may stock quantities of identical elements of the contemplated chain for convenient assembly to any particular length desired to accommodate specific applications.

It is another important object and accomplishmet of the invention to provide a chain having a novel pintle means including fastening means therefor whereby the chain may be advantageously and conveniently assembled and/or disassembled without necessitating any special tools or other equipment.

Heretofore, in many prior art chain structures, coupling problems presented a challenge to the ingenuity of the inventor for a solution whereby the cost due to special handling may be reduced, and more important the finding of a suitable fastening means for pintle pins which may be quickly and conveniently operated to couple the various links of a chain and which may further provide for convenient disassembly if so desired. In this connection it is of importance to note that the subject chain construction provides the advantage of being able to be uncoupled at any pintle connection as desired, this feature being distinguishable from prior art chain constructions where the chain is provided with only one connection link which is effective to couple the loose ends of a strand of chain.

Accordingly, an important object and accomplishment of the invention is to provide a pintle coupling pin including a novel fastening means therefor, said coupling pin being adapted for convenient insertion within connecting links of a chain, and said coupling pin having means whereby the pin is advantageously held in its operative position by merely inserting a roll pin through the coupling pin at an end thereof.

A further object and accomplishment of the invention is to provide a coupling pin for drive chains, adapted for equal advantage for incorporation in both silent and roller chains, said coupling pin having means whereby the coupling pin may be not only conveniently assembled but may be equally as conveniently and advantageously disassembled without the necessity of fancy tools.

An ancillary object and accomplishment of the invention is to provide a new and improved chain drive assembly which is adapted to be economically manufactured and which is so designed as to permit the manufacture and assembly thereof in accordance with present day large scale mass production manufacturing methods of construction and assembly.

The invention seeks, as a final object and accomplishment, to provide a couplin pin and fastening means therefor for drive chains as contemplated herein and characterized by an arrangement of parts to more advantageously and satisfactorily perform the function required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described and as more particularly pointed out in the appended claims.

Embodiments of the invention are illustrated in the accompanying drawings forming a part hereof and wherein:

Fig. 1 is a side elevational view of a chain which includes the contemplated chain coupling pintle means and the novel fastening means therefor which embody the features of the invention contemplated herein;

Fig. 2 is a top plan view of the chain assembly depicted in Fig. 1;

Fig. 3 is a perspective view of the novel pintle fastening means contemplated by this invention; and Fig. 4 is a perspective view of a modified form of pintle fastening means contemplated by this invention.

The drawing is to be understood to be more or less of a schematic character for the purpose of illustrating and disclosing a typical or preferred form of the improvements contemplated herein.

Referring to the drawing, particularly Fig. 1, I have illustrated the coupling pintle means having the novel fastening means therefor with which the present invention is particularly concerned and designated in its entirety by the numeral 20, as being adjunctively employed, for example, to a chain assembly designated in its entirety by the letter A.

In Fig. 3 I have illustrated the pintle fastening means with which the invention is particularly concerned and designated in its entirety by the numeral 21.

In the illustrated embodiment of the invention depicted in Figs. 1 and 2, the pintle fastening means 21 is shown in its normal operative position to couple the chain elements of the chain assembly A.

The chain assembly A may comprise outer links respectively indicated at 25 and 26 and a plurality of inner links of identical construction indicated by the numeral 27, the outer links 25 and 26 and the inner links as at 27 being held in their assembled position by means of the pintles 30 and 31 which project tranversely of the run of the chain through suitable registered apertures 32 provided in the respective chain links.

Suffice it to say, since the invention is not particularly concerned with the precise construction of the illustrated chain and/or its associated parts, they will not be further described in detail and it is deemed sufficient for all intentions and purposes herein contained to show only portions thereof adjacent to and cooperating with the pintle pin means and the novel fastening means therefor contemplated herein. It is to be understood that details of construction of the chain and its associated parts may be modified to suit particular conditions, and I do not wish to be limited to the construction of these elements as set forth except where such construction particularly concerns the invention contemplated herein.

Having thus described, by way of example, a possible adaptation of the pintle pin means and the novel fastening means therefor, and having described the general environment surrounding the adaptation, the specific construction and cooperating functions of the parts of the pintle pin means and the fastening means therefor with which the invention is particularly concerned, will now be described in detail.

In the exemplary embodiment of the invention depicted in Figs. 1, 2 and 3, the pintle pin means and fastening means indicated generally by the reference numeral 20 may comprise, in general, a pair of pintle pins 30 and 31 having working faces, respectively indicated at 40 and 41, in intimate contact therebetween, said pintle pin means being inserted in suitable apertures as at 32 disposed in the respective chain links, both ends of at least one of said pintle pins projecting outwardly from opposite sides of the chain, said projecting ends having through apertures disposed transversely of the longitudinal axis of the related pintle, and a pintle pin fastening means as at 21 disposed in said through apertures and such that the end portions 50 and 51 thereof will lie transversely across the chain link aperture and be in engagement with portions of the side surface of the related outer chain link to restrict axial movement of the pintle pin means.

In general, the pintle pin fastening means 21 comprises a metal blank of resilient metal having the characteristics, for example, of spring steel, said blank being formed to define substantially a tubular shape with a cut 53 parallel to the longitudinal axis thereof, whereby the fastening means may be manually compressed to reduce the circumferential dimension to a degree whereby the fastening means may be manually inserted in the aperture 42 whereupon the manual compressive forces may be removed, and because of its resilient characteristics the fastening means will expand its circumferential dimension to the dimensional limits of the aperture 42 and be maintained in this position responsive to frictional forces emanating from the engagement of the adjacent peripheral portions of the fastening means 21 with the inner surface defined by the aperture 42.

As one possible adaptation of the principles of this invention, attention is invited to Figs. 1 and 2 wherein the chain illustrated is comprised of a pair of pintle means as at 30 and 31. In this connection it can be seen that the pintle pin fastening means 21 is related to both ends of the pintle 31 and, since it is disposed transversely across the aperture 32 it will not only restrict axial movement of the pintle pin 31 but also restrict axial movement of the pintle 30, thereby operatively maintaining the respective pintle pin means in their normal working positions.

It is important to note that in other similar chain constructions only one pintle pin such as, for example, the pintle pin 31 will be employed. In such an event axial movement of a single pintle pin will be restricted in the same manner.

It is notable that when a pair of pintle pin means is employed the fastening means 21 may be related to one of said pintle pin means which would have end portions respectively projecting at each side of the chain for containing a pintle pin fastening means as indicated by the numeral 21.

In accordance with the construction of the present invention, in order to couple the chain links it is only necessary to insert the pintle pin or pins into the aperture 32 and manually compress the pintle pin fastening means 21 so that it can be conveniently inserted in the aperture 42 in the position as shown in Fig. 1 thereby holding the related chain parts in their respective operating positions.

Disassembly of the chain may be conveniently accomplished by merely manually compressing the pintle pin fastening means 21 and withdrawing it from the aperture 42 whereupon the pintle pins may be conveniently removed from their position in the chain link aperture 32 which will completely break down the chain so that its component parts are each free from the other.

In accordance with the construction of the present invention chain strands of any desired length may be conveniently built up in the manner hereinbefore indicated and be as conveniently disassembled, if desired. Moreover, by the teachings of this invention any one or more of the chain links may be conveniently removed or replaced without the requirement of special tools or equipment. Also, the chain strand may be broken at any of its pintle points as desired for convenience in removing the chain from associated sprockets and the like. Furthermore, link element may be either added or subtracted from the chain strand at any point on the chain, if desired.

Attention is invited to Fig. 4 wherein there is shown a modified pintle pin fastening means having the same operative concept as hereinbefore described with respect to the pintle pin fastening means illustrated in Fig. 3 and identified by the numeral 21. The pintle pin fastening means illustrated in Fig. 4 is indicated in its entirety by the numeral 60 and comprises a metal blank of resilient metal having the characteristics, for example, of spring steel, said blank being formed into a spiral-like shape to define a substantially tubular form, said fastening means being manually compressible to reduce the circumferential dimension to a degree whereby the fastening means 60 may be manually inserted in the aperture 42 whereupon the manual compressive forces may be removed, and because of its resilient characteristics the fastening means will expand its circumferential dimension to the dimensional limits of the aperture 42 and be maintained in this position responsive to frictional forces emanating from the engagement of the adjacent peripheral portions of the fastening means 60 with the inner surface defined by the aperture 42.

It is notable that the structures contemplated are economical to manufacture and readily adaptable to mass production manufacturing principles; thereby substantially reducing the cost of manufacture and providing convenience and economy in the assembly and disassembly of chains.

From the foregoing disclosure, it can be observed that I have provided a pintle pin fastening means which efficiently fulfills the objects thereof as hereinbefore set forth and provides numerous advantages which may be summarized as follows:

1. Structurally simple, efficient and durable;

2. Economical to manufacture and readily adaptable to mass production manufacturing principles; and 3. The provision of a chain construction incorporating pintle pin fastening means permitting economical, advantageous and convenient assembly and disassembly completely of a power transmission chain without the necessity of fancy tools.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. A link chain comprising a plurality of groups of elongated links connected in series, the links of each group having apertures through the ends thereof, said links being interleaved so that the apertures at one end of the links of one group is registered with corresponding apertures on the opposite end of the links of an adjacent group, pintle means disposed in said registered apertures for connecting said groups of links together comprising a first pin having a transverse bore through both ends thereof and an inwardly disposed arcuate side surface, and a second pin having a similar arcuate side surface, said pins being positioned so that the inwardly disposed arcuate surfaces abut one another to make line contact, the bored ends of the first pin protruding through said registered apertures on opposite sides of said connected groups of links, and resilient means engageable with each end of said first pin for securing said pintle means to preclude transverse motion of the pins with respect to said groups of links, said resilient securing means comprising a longitudinally split cylindrical tube removably disposed in each said transverse bore immediatedly adjacent corresponding side surfaces of said groups of links.

2. In a link chain having a plurality of groups of elongated links connected in series, the links of each group having apertures through the ends thereof, said links being interleaved so that the apertures at one end of the links of one group is registered with corresponding apertures on the opposite end of the links of an adjacent group, pintle means disposed in said registered apertures for connecting said groups of links together including a first pin having a transverse bore through both ends and an inwardly disposed arcuate side surface, and a second pin having a similar arcuate side surface, said pins being positioned so that the inwardly disposed arcuate surfaces abut one another to make line contact, the bored ends of the first pin protruding through said registered apertures on opposite sides of said groups of links: the combination therewith of resilient means securing said pintle means to preclude transverse motion thereof with respect to said groups of links, said securing means comprising a longitudinally split cylindrical tube having overlapping side edges defining a scroll removably disposed in each said transverse bore and intimately contacting the adjacent side surfaces of said groups of links.

References Cited in the file of this patent

UNITED STATES PATENTS

| | | |
|---|---|---|
| 1,737,823 | Bodle | Dec. 3, 1929 |
| 1,939,986 | Klaucke | Dec. 19, 1933 |
| 2,602,344 | Bremer | July 8, 1952 |
| 2,623,399 | Barrett | Dec. 30, 1952 |

FOREIGN PATENTS

| | | |
|---|---|---|
| 416,839 | Germany | July 27, 1925 |
| 491,041 | Germany | Feb. 6, 1930 |